United States Patent
Yamakawa

(10) Patent No.: US 10,114,255 B2
(45) Date of Patent: Oct. 30, 2018

(54) DISPLAY APPARATUS

(71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 97 days.

(21) Appl. No.: 15/305,542

(22) PCT Filed: Jun. 4, 2014

(86) PCT No.: PCT/JP2014/064870
§ 371 (c)(1),
(2) Date: Oct. 20, 2016

(87) PCT Pub. No.: WO2015/186211
PCT Pub. Date: Dec. 10, 2015

(65) Prior Publication Data
US 2017/0045789 A1    Feb. 16, 2017

(51) Int. Cl.
| G02F 1/1343 | (2006.01) |
| G02F 1/1362 | (2006.01) |
| G09G 3/34 | (2006.01) |
| G09G 3/36 | (2006.01) |
| G02F 1/1368 | (2006.01) |

(52) U.S. Cl.
CPC .. *G02F 1/134336* (2013.01); *G02F 1/136286* (2013.01); *G09G 3/3413* (2013.01); *G09G 3/3614* (2013.01); *G09G 3/3648* (2013.01); *G02F 1/1368* (2013.01); *G02F 2001/134345* (2013.01); *G09G 2300/0426* (2013.01); *G09G 2300/0452* (2013.01); *G09G 2300/0876* (2013.01); *G09G 2310/08* (2013.01); *G09G 2320/0247* (2013.01); *G09G 2320/0276* (2013.01); *G09G 2320/066* (2013.01);
(Continued)

(58) Field of Classification Search
CPC ......... G09G 3/3614; G09G 2300/0443; G09G 2320/028; G09G 2300/0447; G02F 2001/134345
See application file for complete search history.

(56) References Cited

U.S. PATENT DOCUMENTS

2003/0146893 A1* 8/2003 Sawabe ............... G09G 3/3614
345/89
2005/0259064 A1* 11/2005 Sugino .................. G09G 3/342
345/102
(Continued)

FOREIGN PATENT DOCUMENTS

JP    2006098613 A    4/2006
JP    2012-256080 A   12/2012
(Continued)

*Primary Examiner* — Koosha Sharifi-Tafreshi
(74) *Attorney, Agent, or Firm* — Bret E. Field; Bozicevic, Field & Francis LLP

(57) ABSTRACT

A display apparatus includes a liquid crystal panel having a plurality pixels arranged in a matrix shape, in which the plurality of pixels each has a first subpixel and a second subpixel that are divided from each other. The display apparatus includes a control unit configured to control a level of brightness values of the first subpixel and the second subpixel of any one pixel of the plurality of pixels so as to be switched at a prescribed period.

6 Claims, 14 Drawing Sheets

(52) U.S. Cl.
CPC ............. *G09G 2320/068* (2013.01); *G09G 2320/0646* (2013.01); *G09G 2320/0673* (2013.01)

(56) References Cited

U.S. PATENT DOCUMENTS

| | | |
|---|---|---|
| 2006/0066796 A1 | 3/2006 | Ohashi et al. |
| 2008/0106660 A1* | 5/2008 | Kitayama ............ G09G 3/3655 349/39 |
| 2009/0195487 A1* | 8/2009 | Shimoshikiryoh .. G09G 3/3614 345/89 |
| 2010/0103339 A1 | 4/2010 | Shimoshikiryoh et al. |

FOREIGN PATENT DOCUMENTS

| | | |
|---|---|---|
| WO | WO2008023601 A1 | 2/2008 |
| WO | WO2008111490 A1 | 9/2008 |

* cited by examiner

F I G. 1
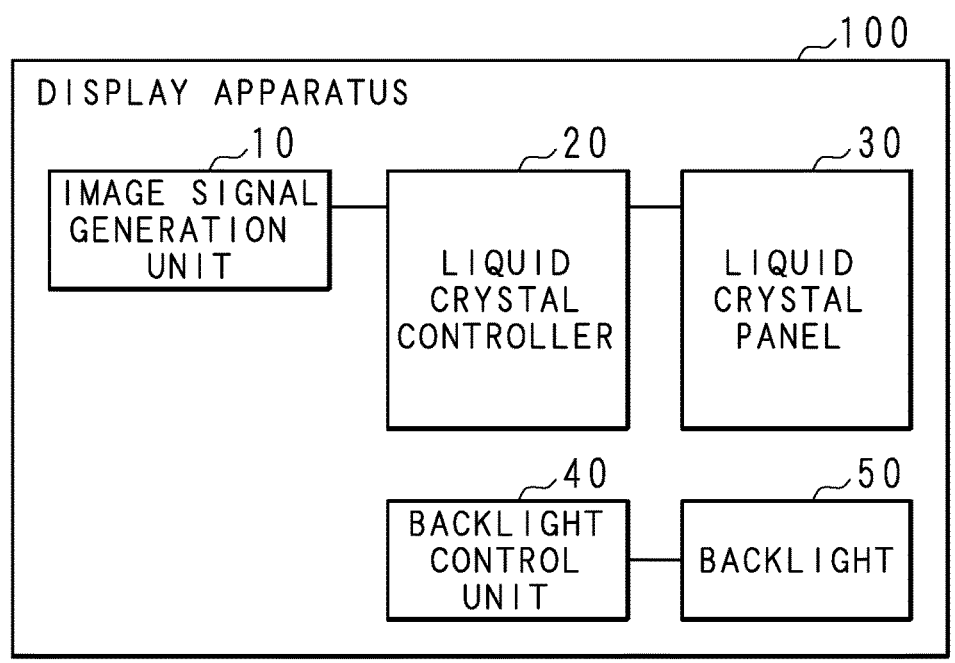

MULTI-PIXEL DRIVING OFF

MULTI-PIXEL DRIVING ON

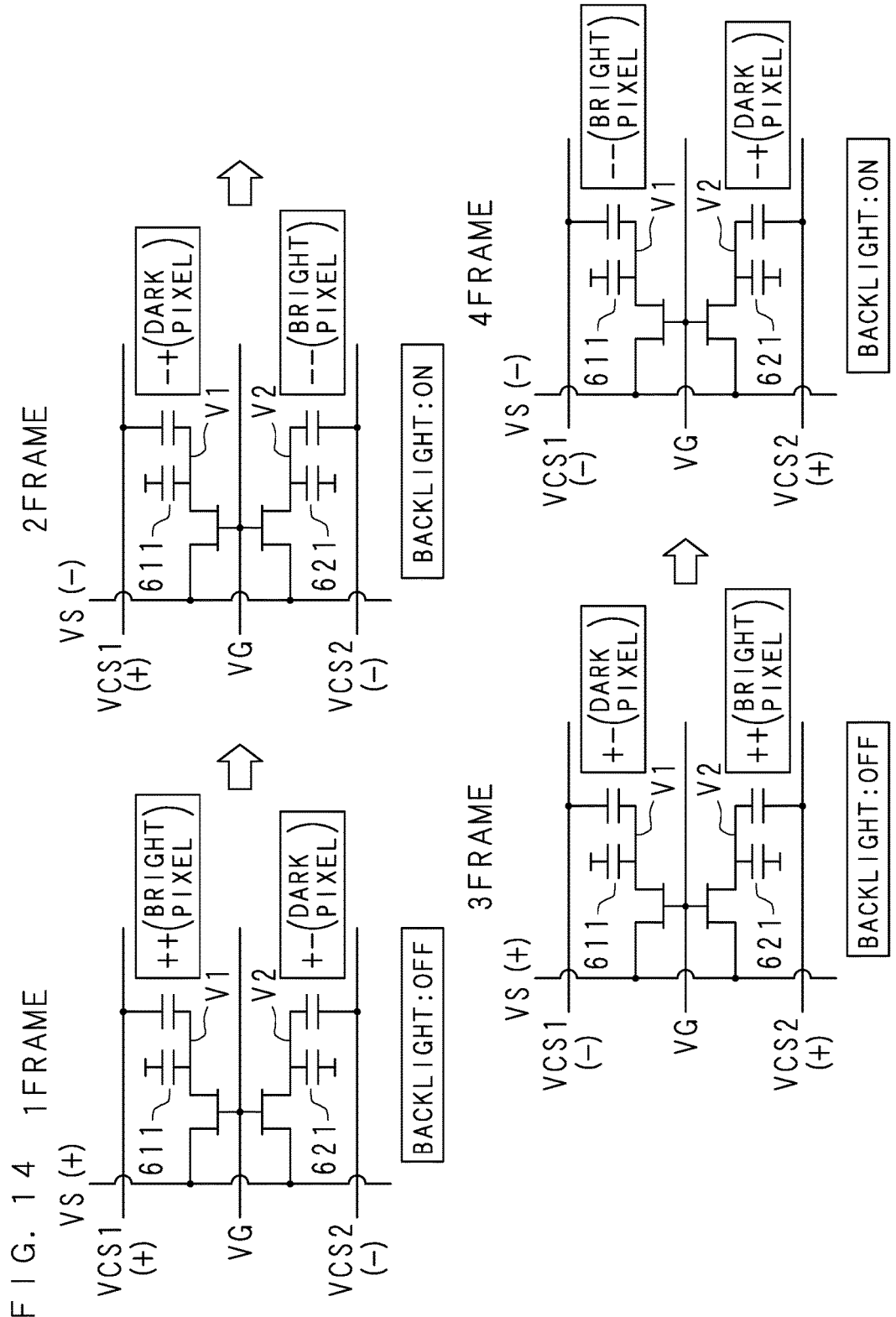

DISPLAY APPARATUS

CROSS-REFERENCE TO RELATED APPLICATIONS

This application is the national phase under 35 U.S.C. § 371 of PCT International Application No. PCT/JP2014/064870 which has an International filing date of Jun. 4, 2014 and designated the United States of America.

FIELD

The present invention relates to a display apparatus including a liquid crystal panel having a plurality of pixels arranged in a matrix shape, in which the plurality of pixels each has a plurality of subpixels that are divided from each other.

BACKGROUND

In a multi-pixel driving type liquid crystal display, a plurality of pixels arranged in a matrix shape each has a plurality of subpixels that may apply different voltages to a liquid crystal layer. The multi-pixel driving type is a technique in which, when one image data (a gradation value, or the like) is applied to any one pixel, one subpixel is made as a bright pixel having a high brightness and the other subpixel is made as a dark pixel having a low brightness, thereby improving visibility (viewing angle characteristics) when seen a liquid crystal display from an oblique direction.

However, in a low gradation area close to a black display, the brightness of the subpixel becomes 0 by a voltage applied to the subpixel corresponding to the dark pixel, thus to be displayed completely black. Further, in the subpixels forming the pixel, the subpixel made as the bright pixel and the subpixel made as the dark pixel are fixedly defined. For this reason, in the low gradation area, there is a problem in that the dark pixel which is displayed completely black appears as a zigzag shape or checkered shape to cause a deterioration in display quality (resolution).

Therefore, in the multi-pixel driving type, as a method for improving roughness of a display due to an arrangement of a zigzag shape or checkered shape, a liquid crystal display apparatus, in which one pixel is divided into three more subpixels, has been disclosed (see Japanese Patent Laid-open Publication No. 2012-256080).

SUMMARY

However, in the liquid crystal display apparatus disclosed in Patent Document 1, it is necessary to associate at least three FETs (transistors), one source bus line, at least one gate bus line, and at least two CS bus lines with each other corresponding to the subpixels, such that a driving circuit is complicated.

In addition, the number of subpixels is set to be 3 or more, thereby high definition of a pixel and a wiring is also required to cause an increase in costs.

In consideration of the above-mentioned circumstances, it is an object of the present disclosure to provide a display apparatus capable of preventing a deterioration in display quality due to an arrangement of a zigzag pattern or a checkered pattern while suppressing an increase in costs.

A display apparatus according to the present disclosure including a liquid crystal panel having a plurality of pixels arranged in a matrix shape, in which the plurality of pixels each has a first subpixel and a second subpixel that are divided from each other, the display apparatus including a control unit configured to control a level of brightness values of the first subpixel and the second subpixel of any one pixel of the plurality of pixels so as to be switched at a prescribed period.

According to the present disclosure, the plurality of pixels arranged in a matrix shape each has the first subpixel and the second subpixel that are divided from each other. The control unit controls the level of brightness values of the first subpixel and the second subpixel of any one pixel of the plurality of pixels so as to be switched at the prescribed period. That is, in any prescribed period, for example, the first subpixel is made as a bright pixel having a high brightness value and the second subpixel is made as a dark pixel having a low brightness value. In a next prescribed period, the level of the brightness value is switched, thereby the first subpixel is made as the dark pixel having a low brightness value and the second subpixel is made as the bright pixel having a high brightness value.

Thereby, in the subpixels forming the pixel, the subpixel made as the bright pixel and the subpixel made as the dark pixel are not fixed, but the first subpixel is switched (flickered) to the bright pixel and the dark pixel, and the second subpixel is switched (flickered) to the dark pixel and the bright pixel each time of prescribed period, and therefore the subpixels are viewed as an average brightness of the bright pixel and the dark pixel to human eyes. Accordingly, since the bright pixel and the dark pixel are viewed without distinction as if multi-pixel driving is turned off, it is possible to prevent a deterioration in display quality due to an arrangement of the zigzag pattern or the checkered pattern in a low gradation area. Further, since dividing the pixel into three or more subpixels is not required, the driving circuit is not complicated, as well as the high definition of the pixel and the wiring is not also required, thus an increase in costs may be suppressed.

The display apparatus according to the present disclosure, wherein, when a gradation value of any one pixel of the plurality of pixels is lower than a prescribed value, the control unit controls so that the brightness values of the first subpixel and the second subpixel of the pixel are equal to each other.

According to the present disclosure, when the gradation value of any one pixel of the plurality of pixels is lower than the prescribed value, the control unit controls so that the brightness values of the first subpixel and the second subpixel of the any pixel are equal to each other. The case in which brightness value is lower than the prescribed value means that the pixel is present in the low gradation area. Further, the prescribed value may be determined based on whether the dark pixel which is displayed completely black appears as the zigzag pattern or the checkered pattern. Thereby, when any pixel is present in the low gradation area, since the brightness values of the first subpixel and the second subpixel of the pixel are equal to each other, that is, since the multi-pixel driving is turned off, it is possible to reliably prevent the zigzag pattern or the checkered pattern from appearing in the dark pixel which is displayed completely black.

The display apparatus according to the present disclosure, including a gate bus line to which a gate signal is supplied, a source bus line to which a source signal is supplied, a first auxiliary bus line and a second auxiliary bus line to which a first auxiliary signal and a second auxiliary signal having different polarities from each other are supplied, respectively, a first FET and a second FET which are connected to the gate bus line and the source bus line, respectively, and a first auxiliary capacitor and a second auxiliary capacitor which are connected to the first auxiliary bus line and the second auxiliary bus line, respectively, wherein one electrode of the first subpixel is connected to the first FET and the first auxiliary capacitor, one electrode of the second subpixel is connected to the second FET and the second auxiliary capacitor, the other electrodes of the first subpixel and the second subpixel are respectively connected to a voltage source which supplies a reference voltage, polarities of the source signals supplied to the first subpixel and the second subpixel are configured to be inverted at a prescribed frame period in synchronization with the gate signal, and the control unit is configured to invert the respective polarities of the first auxiliary signal and the second auxiliary signal, by setting 2N times (N is an integer) of the frame period to be the prescribed period.

According to the present disclosure, the display apparatus includes: the gate bus line to which a gate signal is supplied; the source bus line to which a source signal is supplied; the first auxiliary bus line and the second auxiliary bus line to which the first auxiliary signal and the second auxiliary signal having different polarities are supplied, respectively; the first FET and the second FET of which the gate terminal and the source terminal are connected to the gate bus line and the source bus line, respectively; and the first auxiliary capacitor and the second auxiliary capacitor of which the other terminals are connected to the first auxiliary bus line and the second auxiliary bus line, respectively. The one electrode of the first subpixel is connected a drain terminal of the first FET and one terminal of the first auxiliary capacitor. The one electrode of the second subpixel is connected a drain terminal of the second FET and one terminal of the second auxiliary capacitor. Further, the other electrodes of the first subpixel and the second subpixel are respectively connected to the voltage source which supplies the reference voltage.

In addition, the polarities of the source signals supplied to the first subpixel and the second subpixel are inverted at the prescribed frame period in synchronization with the gate signal. For example, the first FET and the second FET are turned on, and a positive source signal is supplied to the first subpixel and the second subpixel, in a period when the gate signal is turned on (between changed from low to high, and further changed to low). In addition, if the gate signal is turned on at a next frame period, the first FET and the second FET are turned on again, and a negative source signal (source signal inverted with respect to a positive polarity) is supplied to the first subpixel and the second subpixel. That is, it is possible to achieve dot inversion driving.

The control unit inverts the respective polarities of the first auxiliary signal and the second auxiliary signal, by setting 2N times (N is an integer) of the frame period to be the prescribed period. For example, the positive source signal is supplied at a first frame of the frame period, the negative source signal is supplied at a second frame, the positive source signal is supplied at a third frame, and the negative source signal is supplied at a fourth frame. In this case, the first auxiliary signal is positively inverted and the second auxiliary signal is negatively inverted, at the first frame and the second frame, and the polarities of each of the first auxiliary signal and the second auxiliary signal are inverted, and thus the first auxiliary signal is negatively inverted, and the second auxiliary signal is positively inverted, at the third frame and the fourth frame. Thereby, the first subpixel may be switched to the bright pixel and the dark pixel for each two frame, and the second subpixel may be switched to the dark pixel and the bright pixel for each two frame, such that the subpixels are viewed as the average brightness of the bright pixel and the dark pixel to human eyes. Accordingly, since the bright pixel and the dark pixel are viewed without distinction, it is possible to prevent a deterioration in display quality due to an arrangement of the zigzag pattern or the checkered pattern in the low gradation area.

The display apparatus according to the present disclosure, including a first auxiliary switching element and a second auxiliary switching element which are respectively connected to the first auxiliary capacitor and the second auxiliary capacitor in series, wherein each of the first auxiliary switching element and the second auxiliary switching element is turned off when voltages of the source signals are within a prescribed range with a reference voltage interposed therebetween.

According to the present disclosure, the display apparatus includes: the first auxiliary switching element and the second auxiliary switching element which are respectively connected to the first auxiliary capacitor and the second auxiliary capacitor in series. Each of the first auxiliary switching element and the second auxiliary switching element is turned off when the voltages of the source signals are within the prescribed range with a reference voltage interposed therebetween.

Since the voltage applied between the electrodes of the first subpixel and the second subpixel is in proportion to a voltage difference between the source voltage and the reference voltage, the case in which when the voltages of the source signals are within the prescribed range with the reference voltage interposed therebetween refers to a case that the voltage applied between the electrodes of the first subpixel and the second subpixel is small, and means that the pixel is present in the low gradation area. That is, when the pixel is present in the low gradation area, the first auxiliary switching element and the second auxiliary switching element are turned off, thereby the first auxiliary signal and the second auxiliary signal are not supplied. As a result, a so-called multi-pixel driving is turned off, such that the brightness values of the first subpixel and the second subpixel are equal to each other. Thereby, in the low gradation area, it is possible to reliably prevent the zigzag pattern or the checkered pattern from appearing in the dark pixel which is displayed completely black.

The display apparatus according to the present disclosure, including a backlight for the liquid crystal panel, and a backlight control unit configured to control so as to flicker the backlight in synchronization with the frame period.

According to the present disclosure, the display apparatus includes: the backlight for the liquid crystal panel; and the backlight control unit configured to control so as to flicker the backlight in synchronization with the frame period.

For example, when the first subpixel is switched to the bright pixel and the dark pixel for each two frame, and the second subpixel is switched to the dark pixel and the bright pixel for each two frame, the backlight flickers for each one frame, thereby equivalently (in appearance), the first subpixel may be switched to the bright pixel and the dark pixel for each one frame, and the second subpixel may be switched to the dark pixel and the bright pixel for each one frame, such that the subpixels are viewed as the average brightness of the bright pixel and the dark pixel to the human eyes. Accordingly, since the bright pixel and the dark pixel are viewed without distinction, it is possible to prevent a deterioration in display quality due to an arrangement of the zigzag pattern or the checkered pattern in the low gradation area.

According to the present disclosure, it is possible to prevent a deterioration in display quality due to an arrangement of the zigzag pattern or the checkered pattern while suppressing an increase in costs.

The above and further objects and features of the invention will more fully be apparent from the following detailed description with accompanying drawings.

BRIEF DESCRIPTION OF THE DRAWINGS

FIG. 1 is a block diagram illustrating one example of a configuration of a display apparatus according to a first embodiment.

FIG. 14 is a schematic view illustrating one example of multi-pixel driving by a display apparatus according to a third embodiment.

DETAILED DESCRIPTION (First Embodiment)

Figure 2:
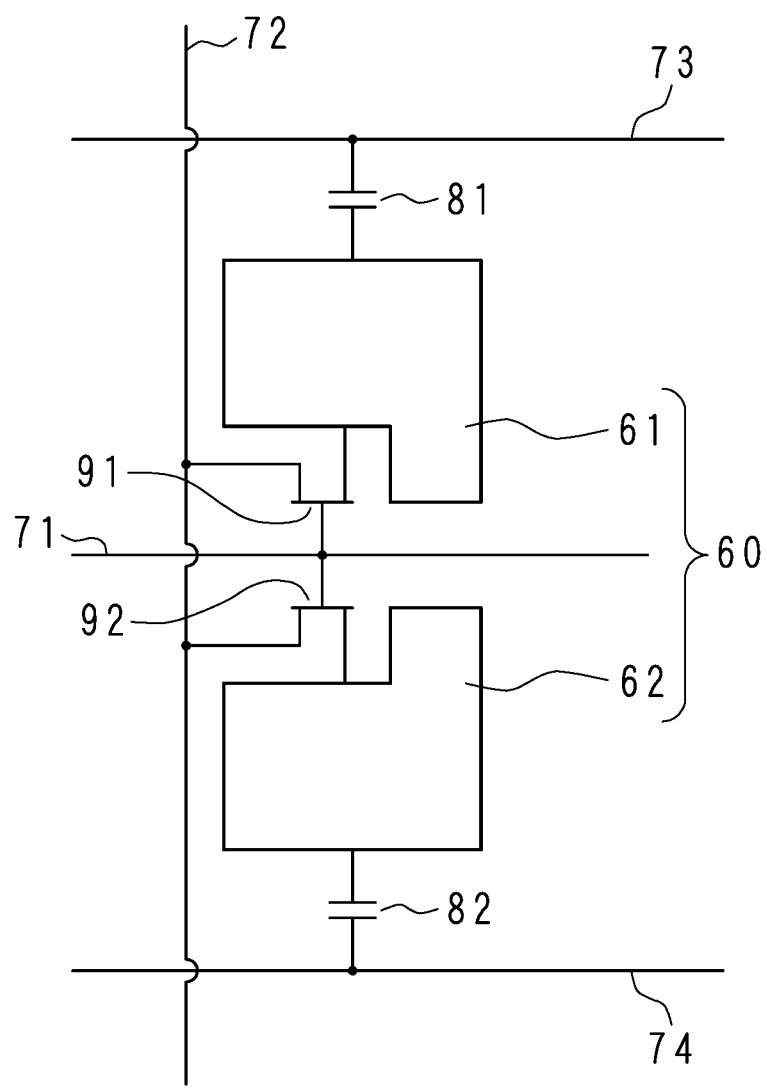
FIG. 2 is a schematic view illustrating one example of a configuration of a pixel of the display apparatus according to the first embodiment.

Hereinafter, embodiments of the present invention will be described with reference to the accompanying drawings. FIG. 1 is a block diagram illustrating one example of a configuration of a display apparatus 100 according to a first embodiment. As illustrated in FIG. 1, the display apparatus 100 includes an image signal generation unit 10, a liquid crystal controller 20, a liquid crystal panel 30, a backlight control unit 40, a backlight 50, and the like.

The image signal generation unit 10 generates image data (for example, digital RGB signals) of an image displayed on a display screen (liquid crystal panel 30) and outputs the generated image data to the liquid crystal controller 20. Further, the image signal generation unit 10 may acquire color image signals such as a television signal from the outside.

The liquid crystal panel 30 has a structure, in which a pair of glass substrates are disposed to face each other and a liquid crystal layer of a liquid crystal material is formed in a gap therebetween, and includes a gate driver connected to gates of each FET in association with each of the plurality of pixels, and a source driver connected to sources of each FET.

The liquid crystal panel 30 performs a gradation display of an image in such a way that turn on and/or off of TFTs of each pixel is controlled by a gate signal input from the gate driver, and light transmittance determined by electro-optical characteristics of the liquid crystal material is controlled depending on a level of voltage input from the source driver in a turn-on period of the FET.

The liquid crystal controller 20 generates a data signal for a driver based on the image data output from the image signal generation unit 10, and outputs the generated data signal for the driver to the liquid crystal panel 30. In addition, the liquid crystal controller 20 generates a timing control signal for operating a gate driver and a source driver within the liquid crystal panel 30 at a desired operation timing, and outputs the generated timing control signal to the liquid crystal panel 30.

The backlight 50 is controlled by the backlight control unit 40 to irradiate a back surface of the liquid crystal panel 30 with light.

In the liquid crystal panel 30, a plurality of pixels are arranged in a matrix shape. In addition, the plurality of pixels each has a first subpixel and a second subpixel that are divided from each other.

Figure 3:
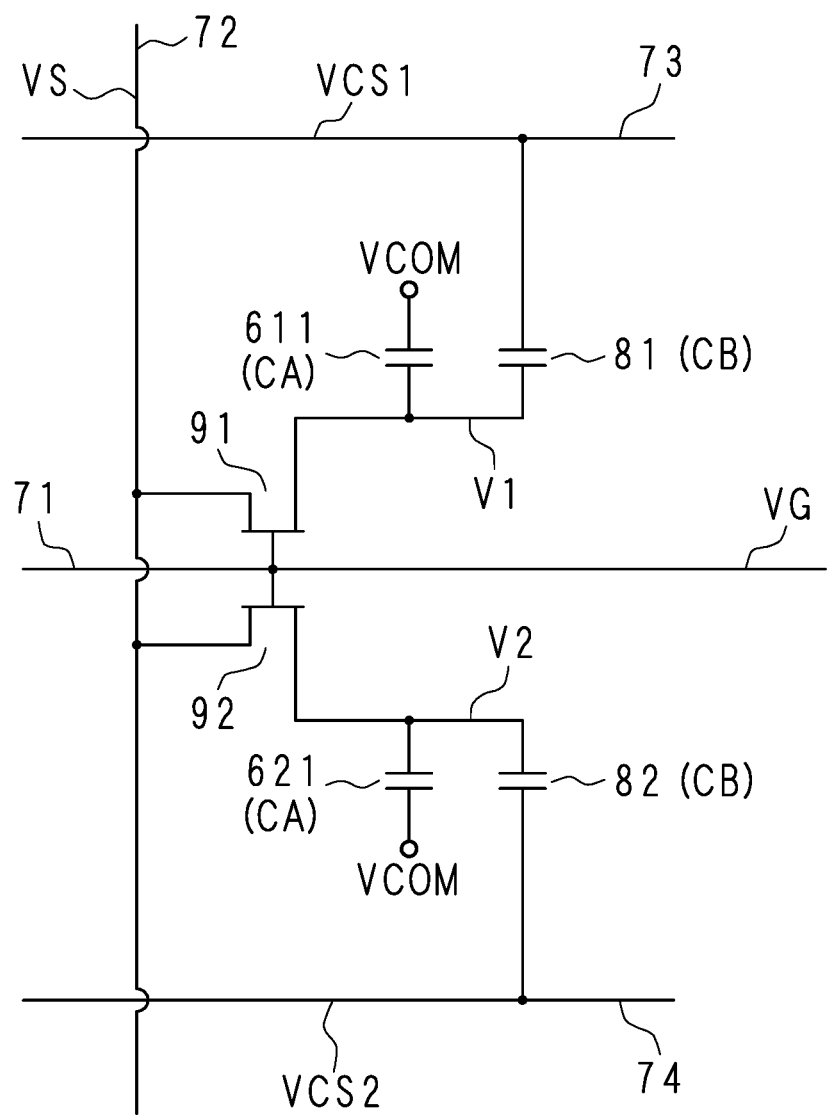
FIG. 3 is a schematic view illustrating one example of an equivalent circuit of the pixel illustrated in FIG. 2.

FIG. 2 is a schematic view illustrating one example of a configuration of a pixel of the display apparatus 100 according to the first embodiment, and FIG. 3 is a schematic view illustrating one example of an equivalent circuit of the pixel illustrated in FIG. 2. FIG. 2 illustrates any pixel 60 of the plurality of pixels arranged in a matrix shape of the liquid crystal panel 30.

As illustrated in FIG. 2, the pixel 60 has a subpixel 61 (first subpixel) and a subpixel 62 (second subpixel) that are divided from each other. That is, the pixel 60 is divided into the subpixel 61 and the subpixel 62.

The subpixel 61 is connected to a drain of an FET 91 (first FET), a gate of the FET 91 is connected to a gate bus line 71 (scanning line), and a source of the FET 91 is connected to a source bus line 72 (signal line). Further, the subpixel 61 is connected to one terminal of an auxiliary capacitor 81 (first auxiliary capacitor), and the other terminal of the auxiliary capacitor 81 is connected to a first CS bus line 73 (first auxiliary bus line).

Similarly, the subpixel 62 is connected to a drain of an FET 92 (second FET), a gate of the FET 92 is connected to the gate bus line 71 (scanning line), and a source of the FET 92 is connected to the source bus line 72 (signal line). Further, the subpixel 62 is connected to one terminal of an auxiliary capacitor 82 (second auxiliary capacitor), and the other terminal of the auxiliary capacitor 82 is connected to a second CS bus line 74 (second auxiliary bus line). Further, a 'CS' of the first CS bus line 73 and the second CS bus line 74 means auxiliary capacitance.

The subpixels 61 and 62 may be electrically represented by capacitors 611 and 621 (also referred to as a liquid crystal capacitor) between two electrodes. That is, one electrode of the subpixel 61 is connected to the drain of the FET 91 and one terminal of the auxiliary capacitor 81, and the other electrode of the subpixel 61 is connected to a voltage source supplying a reference voltage VCOM. Similarly, one electrode of the subpixel 62 is connected to the drain of the FET 92 and one terminal of the auxiliary capacitor 82, and the other electrode of the subpixel 62 is connected to the voltage source supplying the reference voltage VCOM common to the subpixel 61.

In addition, in the following description, a voltage (gate voltage) of a gate signal supplied to the gate bus line 71 is represented by VG, a voltage (source voltage) of a source signal supplied to the source bus line 72 is represented by VS, a voltage of a first CS signal (first auxiliary signal) supplied to the first CS bus line 73 is represented by VCS1, and a voltage of a second CS signal (second auxiliary signal) supplied to the second CS bus line 74 is represented by VCS2. The first CS signal and the second CS signal have different polarities from each other.

Further, a voltage of the one electrode of the subpixel 61 is represented by V1 and a voltage of the one electrode of the subpixel 62 is represented by V2. In addition, the capacitance of the subpixels 61 and 62 is represented by CA, and the capacitance of the auxiliary capacitor 81 and the auxiliary capacitor 82 is represented by CB.

As described above, in the present embodiment, the display apparatus includes the gate bus line 71 to which the gate signal is supplied, the source bus line 72 to which the source signal is supplied, the first CS bus line 73 and the second CS bus line 74 to which the first CS signal and the second CS signal having different polarities are each supplied, the FET 91 and the FET 92 of which the gate terminal and the source terminal are connected to the gate bus line 71 and the source bus line 72, respectively, and the auxiliary capacitors 81 and 82 of which the other terminals are connected to the first CS bus line 73 and the second CS bus line 74, respectively. The one electrode of the subpixel 61 is connected to the drain terminal of the FET 91 and one terminal of the auxiliary capacitor 81. Further, the one electrode of the subpixel 62 is connected to the drain terminal of the FET 92 and the one terminal of the auxiliary capacitor 82. Further, the other electrodes of the subpixels 61 and 62 are connected to the voltage source supplying the reference voltage VCOM, respectively.

Next, a so-called multi-pixel driving that divides one pixel into a plurality of subpixels having different brightness from each other will be described.

Figure 4:
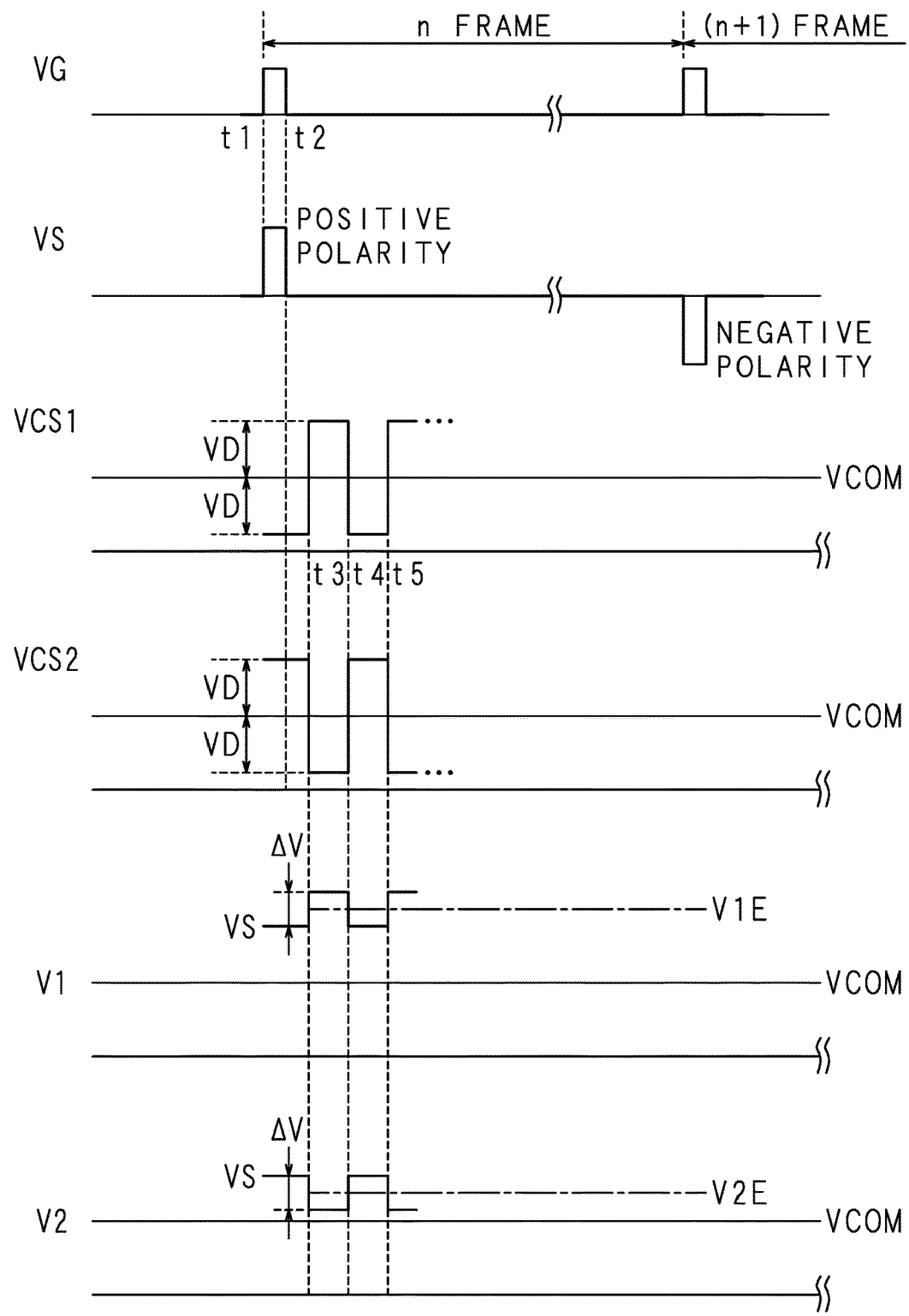
FIG. 4 is a time chart illustrating one example of timing of voltages of each part when attention is paid to any pixel within the liquid crystal panel.

FIG. 4 is a time chart illustrating one example of timing of voltages of each part when attention is paid to any pixel within the liquid crystal panel 30. Further, voltage waveforms of each part illustrated in FIG. 4 are schematically represented, and the voltage waveforms are often different from the actual voltage waveform. In FIG. 4, the gate voltage VG, the source voltage VS, the first CS voltage VCS1, the second CS voltage VCS2, one electrode voltage V1 of the subpixel 61, and one electrode voltage V2 of the subpixel 62 are illustrated from a top.

When attention is paid to one pixel (subpixels 61 and 62), the gate signal is repeatedly supplied to the gate bus line 71 at a prescribed frame period. As illustrated in FIG. 4, in an n frame, the gate voltage VG becomes from low to high at time t1 and the gate voltage VG becomes from high to low at time t2. Further, for the corresponding pixel, next, the gate voltage becomes from low to high at the time of (n+1) frame.

In a period (period from time t1 to time t2) when the gate voltage VG is high, the FET 91 and the FET 92 are turned on, and the source signal (source voltage VS) is applied to the one electrodes of the subpixels 61 and 62, respectively. FIG. 4 illustrates only a timing when the source voltage VG is applied.

In addition, the source voltage is a positive polarity at, for example, the n frame and is a negative polarity inverted with respected to the positive polarity at a next (n+1) frame.

That is, the present embodiment employs a dot inversion driving scheme.

The first CS signal and the second CS signal have different polarities from each other, and are signals of which the amplitude is changed by ±VD with the reference voltage VCOM interposed therebetween. In addition, at time t2, the first CS voltage VCS1 of the first CS signal is a negative polarity (VCS1=VCOM−VD) and the second CS voltage VCS2 of the second CS signal is a positive polarity (VCS2=VCOM+VD).

At time t3 after time t2, the first CS voltage VCS1 is increased by (2×VD) from VCOM−VD to VCOM+VD (positive inversion). Further, at time t3, the second CS voltage VCS2 is decreased by (2×VD) from VCOM+VD to VCOM−VD (negative inversion).

At time t2, the voltage V1 of the one electrode of the subpixel 61 is equal to the source voltage VS.

As described above, since the first CS voltage VCS1 is increased by (2×VD) at time t3, the voltage V1 of the one electrode of the subpixel 61 is increased by ΔV from the voltage VS, and thus V1=VS+ΔV.

Herein, ΔV may be represented by ΔV=K×2×VD. However, K becomes K=CB/(CA+CB). Briefly, the voltage V1 of the one electrode of the subpixel 61 is increased by a thrust-up action of the first CS voltage.

Further, at time t2, the voltage V2 of the one electrode of the subpixel 62 is equal to the source voltage VS. As described above, since the second CS voltage VCS2 is decreased by (2×VD) at time t3, the voltage V2 of the one electrode of the subpixel 62 is decreased by ΔV from the voltage VS, and thus V1=VS−ΔV. Herein, ΔV may be represented by ΔV=K×2×VD. However, K becomes K=CB/(CA+CB). Briefly, the voltage V2 of the one electrode of the subpixel 62 is decreased by the thrust-down action of the second CS voltage.

Next, since the first CS voltage VCS1 is decreased by (2×VD) at time t4, the voltage V1 of the one electrode of the subpixel 61 is decreased by ΔV from the voltage VS+ΔV, and thus V1=VS.

Further, since the second CS voltage VCS2 is increased by (2×VD) at time t4, the voltage V2 of the one electrode of the subpixel 62 is increased by ΔV from the voltage VS−ΔV, and thus V1=VS.

Next, since the first CS voltage VCS1 is increased by (2×VD) at time t5, the voltage V1 of the one electrode of the subpixel 61 is increased by ΔV from the voltage VS, and thus V1=VS+ΔV.

Further, since the second CS voltage VCS2 is decreased by (2×VD) at time t5, the voltage V2 of the one electrode of the subpixel 62 is decreased by ΔV from the voltage VS, and thus V1=VS−ΔV.

Hereinafter, the same operation as time t3 to t5 is repeated in the n frame. In addition, as illustrated in FIG. 4, an effective value V1E of the voltage V1 of the one electrode of the subpixel 61 becomes VS+ΔV/2, and an effective value V2E of the voltage V2 of the one electrode of the subpixel 62 becomes VS−ΔV/2. Since the reference voltage VCOM is applied to a common electrode of the subpixels 61 and 62, the voltage between the electrodes of the subpixel 61 is V1E−VCOM, and therefore the voltage between the electrodes of the subpixel 61 becomes VS+ΔV/2−VCOM. Further, the voltage between the electrodes of the subpixel 62 becomes V2E−VCOM, and therefore the voltage between the electrodes of the subpixel 62 becomes VS−ΔV/2−VCOM. That is, the subpixel 61 having a high voltage between the electrodes becomes a bright pixel having a large brightness value, and the subpixel 62 having a low voltage between the electrodes becomes a dark pixel having a small brightness value.

Figure 5:
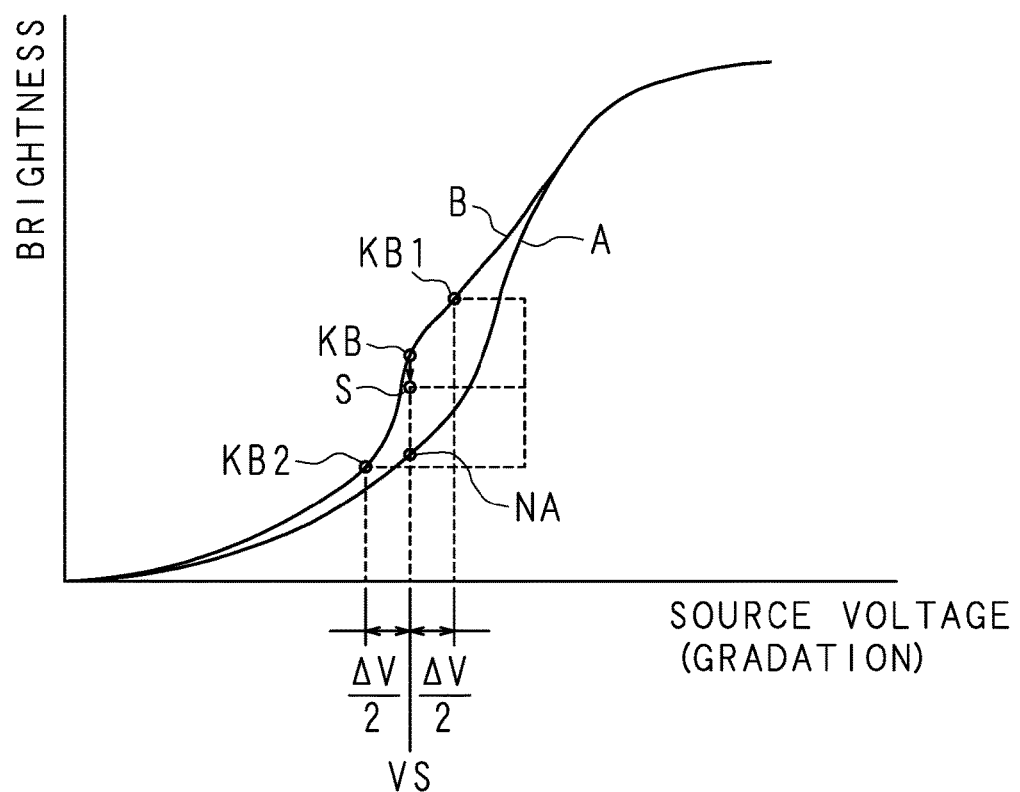
FIG. 5 is a schematic view illustrating one example of display characteristics by multi-pixel driving.

FIG. 5 is a schematic view illustrating one example of display characteristics by the multi-pixel driving.

In FIG. 5, a horizontal axis represents a source voltage (gradation), and a horizontal axis represents brightness.

In FIG. 5, a curved line illustrated by symbol A represents brightness characteristics when seen a display screen from a front direction, and a curved line illustrated by symbol B represents brightness characteristics when seen the display screen from an oblique direction.

As illustrated in FIG. 5, when the source voltage is VS, the brightness in the front direction is considered as NA, and the brightness in the oblique direction is considered as KB. When the voltage (VS+ΔV/2) is applied to one subpixel, the brightness in the oblique direction is considered as KB1, and when the voltage (VS−ΔV/2) is applied to the other subpixel, the brightness in the oblique direction is considered as KB2.

In this case, it can be appreciated that the brightness in the oblique direction becomes (KB1+KB2)/2, which is an average of brightness of each subpixel, becomes a value illustrated by a point S, and is smaller than the brightness KB. That is, in a case of not using the multi-pixel driving, the brightness is the brightness KB in the oblique direction when the source voltage VS is applied, while in a case of using the multi-pixel driving, the brightness may be changed to a value illustrated by the point S, thus to approach the brightness NA in the front direction.

Figure 6:
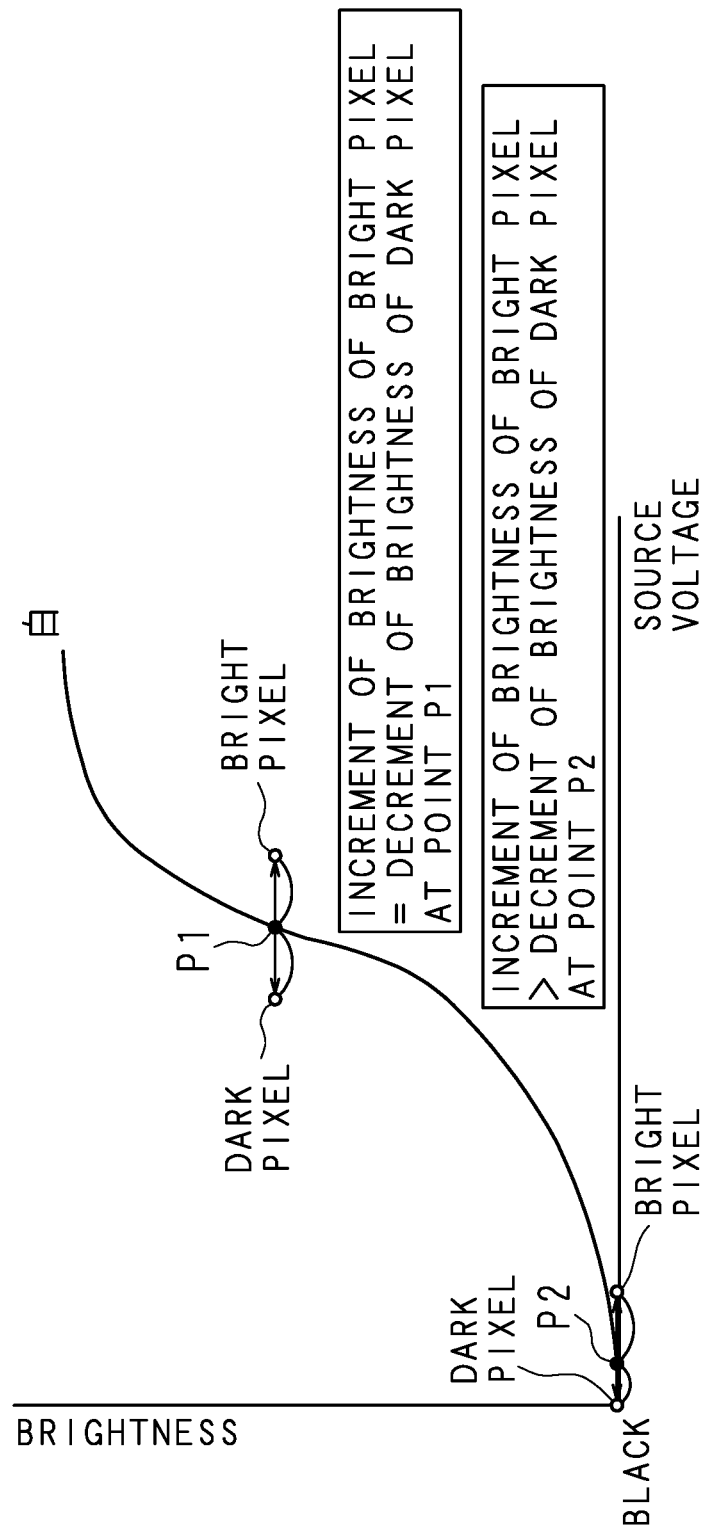
FIG. 6 is a schematic view illustrating one example of brightness characteristics for a source voltage in a conventional liquid crystal panel.

Next, in a case of conventional multi-pixel driving, an occurrence of a deterioration in display quality (resolution) in the low gradation area will be described. FIG. 6 is a schematic view illustrating one example of brightness characteristics for a source voltage in a conventional liquid crystal panel. In the example of FIG. 6, similar to the above-described example, one pixel is divided into two subpixels. The subpixel whose source voltage is high by ΔV/2 is the bright pixel, and the subpixel whose source voltage is low by ΔV/2 is the dark pixel. As illustrated in FIG. 6, in an intermediate gradation area between a black display and a white display, which is illustrated by a point P1, an increment in an amount of brightness of the bright pixel may be equal to an decrement in the amount of brightness of the dark pixel. Thereby, in the intermediate gradation, powdery finish may be decreased to approach gamma characteristics in a front view, and in particular, a squint quality such as skin color display may be improved.

One the other hand, in the low gradation area close to the black display, which is illustrated by a point P2, for the dark pixel, when a voltage that is small (low) by ΔV/2 is applied thereto, it exceeds a voltage that displays completely black, and the display may not be darker than that, thus to be displayed completely black. Meanwhile, for the bright pixel, when a voltage that is large (high) by ΔV/2 is applied thereto, the brightness may be increased depending on the voltage. That is, in the low gradation area illustrated by the point P2, the increment in amount of brightness of the bright pixel is larger (>) than a decrement in amount of the dark pixel. Therefore, the brightness is increased, and the gradation is represented by only the bright pixel, such that the display quality is deteriorated. For this reason, in the low gradation area, effects of improving the powdery finish by the multi-pixel driving is not almost obtained.

Figure 7:
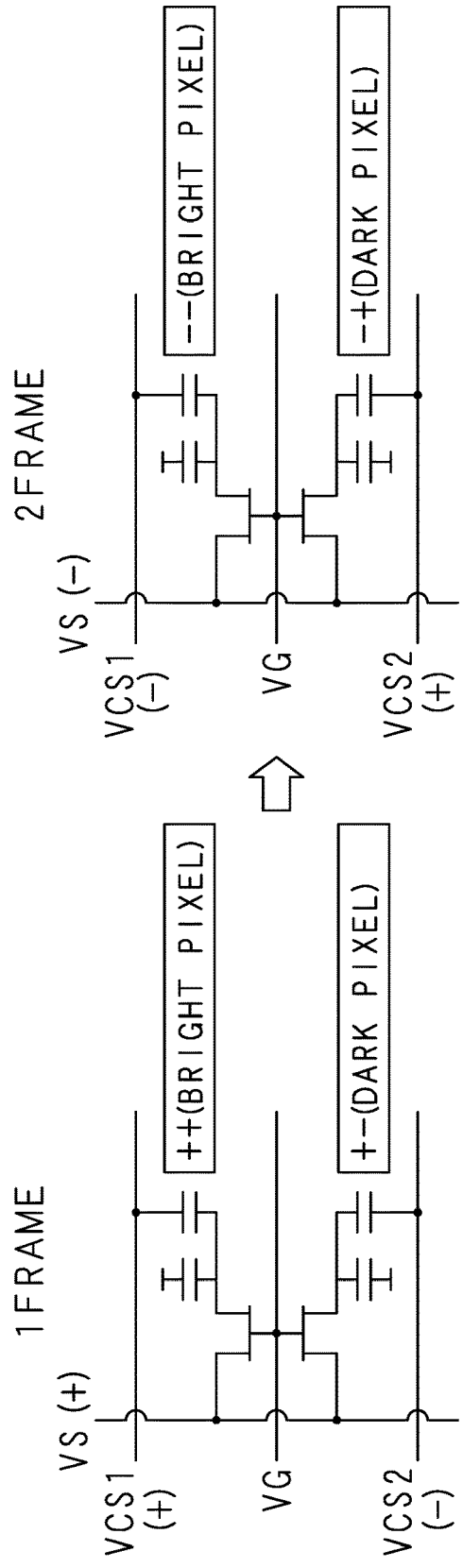
FIG. 7 is a schematic view illustrating one example of the multi-pixel driving in the conventional liquid crystal panel.

FIG. 7 is a schematic view illustrating one example of the multi-pixel driving in the conventional liquid crystal panel. In FIG. 7, VS (+) represents that the voltage VS of the source signal is the positive polarity in a period when the gate signal is high, and VS (−) represents that the voltage VS of the source signal is the negative polarity in a period when the gate signal is high.

Further, VCS1 (+) represents the positive inversion, and represents that, after the gate signal is changed from high to low, the first CS voltage VCS1 is increased from the negative polarity to the positive polarity, and then is repeatedly increased and decreased. In other words, the VCS1 (+) represents that a thrust-up action of voltage is operated. The VCS1 (−) represents the negative inversion, and represents that, after the gate signal is changed from high to low, the first CS voltage VCS1 is decreased from the positive polarity to the negative polarity, and then is repeatedly increased and decreased. In other words, the VCS1 (−) represents that a thrust-down action of voltage is operated. The second CS voltage VCS2 is the same as the above description.

Further, a first (left) symbol of two symbols denoted to the subpixel represents the polarity of the source voltage, wherein + represents the positive polarity thereof, and − represents the negative polarity thereof. Next, a (right) symbol represents an inversion polarity of the CS voltage, wherein + represents the positive inversion thereof, and − represents the negative inversion thereof.

As illustrated in FIG. 7, in the conventional multi-pixel driving, in a first frame, which is VS (+), VCS1 (+), and VCS2 (−), the thrust-up action of voltage is operated on an upper subpixel with the positive source voltage being applied, thus to become the bright pixel. Meanwhile, a thrust-down action of a voltage is operated on a lower subpixel, thus to become the dark pixel.

In a second frame, which is VS (−), VCS1 (−), and VCS2 (+), the thrust-down action of voltage is operated on the upper subpixel with the negative source voltage being applied, thus to become the bright pixel. Meanwhile, a thrust-up action of a voltage is operated on the lower subpixel, thus to become the dark pixel.

Next, the same operation as the first frame and the second frame is repeated, but as can be appreciated from FIG. 7, of the two subpixels, the subpixel (upper subpixel) to be the bright pixel and the subpixel (lower subpixel) to be the dark pixel are fixedly defined.

Figure 8A:
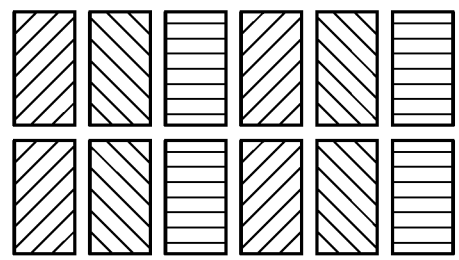
FIG. 8A is a schematic view illustrating an arrangement example of the pixel in a conventional multi-pixel driving.
Figure 8B:
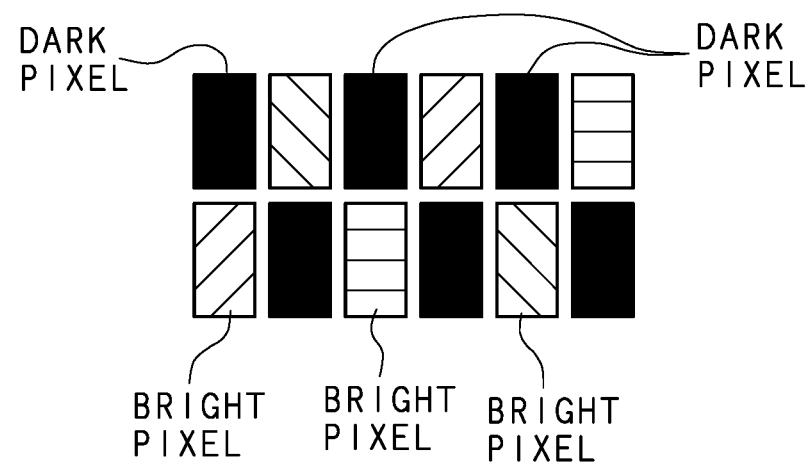
FIG. 8B is a schematic view illustrating an arrangement example of the pixel in a conventional multi-pixel driving.

FIG. 8A and FIG. 8B is a schematic view illustrating an arrangement example of the pixel in the conventional multi-pixel driving.

As illustrated in FIG. 8, each pixel of RGB is sequentially arranged in a column shape, and each pixel of RGB has two subpixels that are divided into the upper portion or the lower portion. In this case, the positions of the bright pixel and the dark pixel are changed to the upper portion and the lower portion when seen between adjacent pixels.

As illustrated in FIG. 8A, when the multi-pixel driving is turned off, each subpixel of the upper portions and the lower portions of each pixel of RGB is applied with the same source voltage, thus to have the same brightness.

Meanwhile, as illustrated in FIG. 8B, when the multi-pixel driving is turned on, in the low gradation area, the position of the dark pixel is fixedly defined for each pixel. Therefore, the subpixel displayed completely black appears as the zigzag pattern or the checkered pattern, such that the display quality (resolution) is deteriorated.

The display apparatus 100 of the present embodiment may solve the above problems described with reference to FIGS. 6 and 8, which will be described in detail below.

Figure 9:
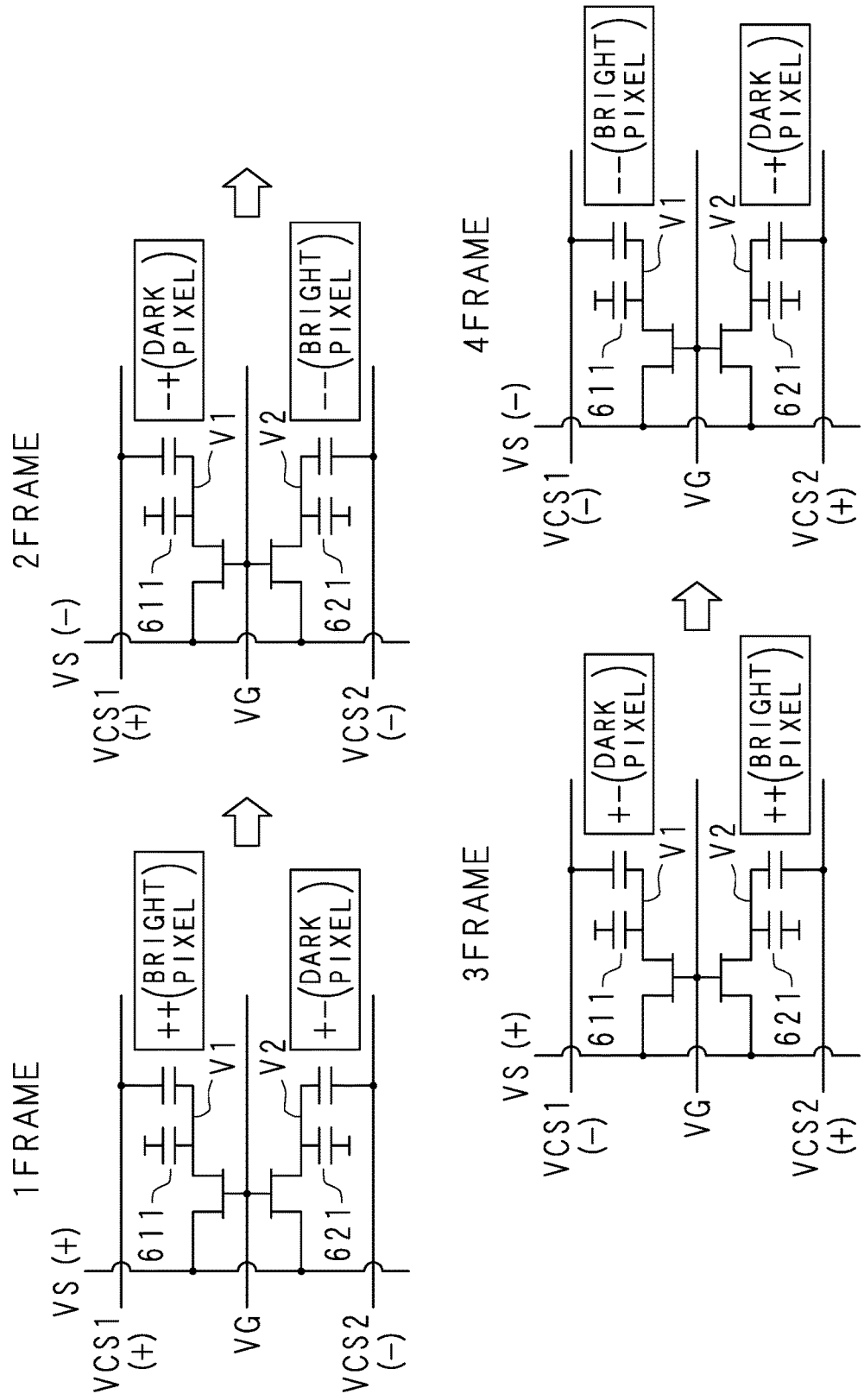
FIG. 9 is a schematic view illustrating one example of the multi-pixel driving by the display apparatus according to the first embodiment.

FIG. 9 is a schematic view illustrating one example of the multi-pixel driving by the display apparatus 100 according to the first embodiment.

Similar to FIG. 7, VS (+) represents that the voltage VS of the source signal is the positive polarity in the period when the gate signal is high, and VS (−) represents that the voltage VS of the source signal is the negative polarity in the period when the gate signal is high.

Further, VCS1 (+) represents the positive inversion, and represents that, after the gate signal is changed from high to low, the first CS voltage VCS1 is increased from the negative polarity to the positive polarity, and then is repeatedly increased and decreased. In other words, the VCS1 (+) represents that the thrust-up action of voltage is operated. The VCS1 (−) represents the negative inversion, and represents that, after the gate signal is changed from high to low, the first CS voltage VCS1 is decreased from the positive polarity to the negative polarity, and then is repeatedly increased and decreased. In other words, the VCS1 (−) represents that the thrust-down action of voltage is operated. The second CS voltage VCS2 is the same as the above description.

Further, a first (left) symbol of two symbols denoted to the subpixel represents the polarity of the source voltage, wherein + represents the positive polarity thereof, and − represents the negative polarity thereof. Next, a (right) symbol represents an inversion polarity of the CS voltage, wherein + represents the positive inversion thereof, and − represents the negative inversion thereof.

As illustrated in FIG. 9, in the multi-pixel driving according to the present embodiment, in first frame, which is VS (+), VCS1 (+), and VCS2 (−), the thrust-up action of voltage is operated on the upper subpixel with the positive source voltage being applied, thus to become the bright pixel. Meanwhile, the thrust-down action of voltage is operated on the lower subpixel, thus to become the dark pixel.

In a second frame, which is VS (−), VCS1 (+), and VCS2 (−), the thrust-up action of voltage is operated on the upper subpixel with the negative source voltage being applied, thus to become the dark pixel. Meanwhile, the thrust-down action of voltage is operated on the lower subpixel, thus to become the bright pixel.

In a third frame, which is VS (+), VCS1 (−), and VCS2 (+), the thrust-down action of voltage is operated on the upper subpixel with the positive source voltage being applied, thus to become the dark pixel. Meanwhile, the thrust-up action of the voltage is operated on the lower subpixel, thus to become the bright pixel.

In a fourth frame, which is VS (−), VCS1 (−), and VCS2 (+), the thrust-down action of voltage is operated on the upper subpixel with the negative source voltage being applied, thus to become the bright pixel. Meanwhile, the thrust-up action of a voltage is operated on the lower subpixel, thus to become the dark pixel.

As described above, the subpixel to be the bright pixel and the subpixel to be the dark pixel are switched for each two frame of two times of the frame period.

That is, the liquid crystal controller 20 serves as a control unit, and controls a level of the brightness values of the subpixel 61 and the subpixel 62 of any one pixel of the plurality of pixels so as to be switched at a prescribed period (for each two frame in the example of FIG. 9). That is, in any prescribed period, for example, the subpixel 61 is made as a bright pixel having a high brightness value, and the subpixel 62 is made as a dark pixel having a low brightness value. In a next prescribed period, the level of the brightness value is switched, thereby the subpixel 61 is made as the dark pixel having a low brightness value, and the subpixel 62 is made as the bright pixel having a high brightness value.

Thereby, in the subpixels forming the pixel, the subpixel made as the bright pixel and the subpixel made as the dark pixel are not fixed, but one subpixel is switched (flickered) to the bright pixel and the dark pixel, and the other subpixel is switched (flickered) to the dark pixel and the bright pixel each time of prescribed period, and therefore the subpixels are viewed as an average brightness of the bright pixel and the dark pixel to human eyes. Accordingly, since the bright pixel and the dark pixel are viewed without distinction as if the multi-pixel driving is turned off, it is possible to prevent a deterioration in display quality due to an arrangement of the zigzag pattern or the checkered pattern in the low gradation area. Further, since dividing the pixel into three or more subpixels is not required, the driving circuit is not complicated, as well as the high definition of the pixel and the wiring is not also required, thus an increase in costs may be suppressed.

Figure 10:
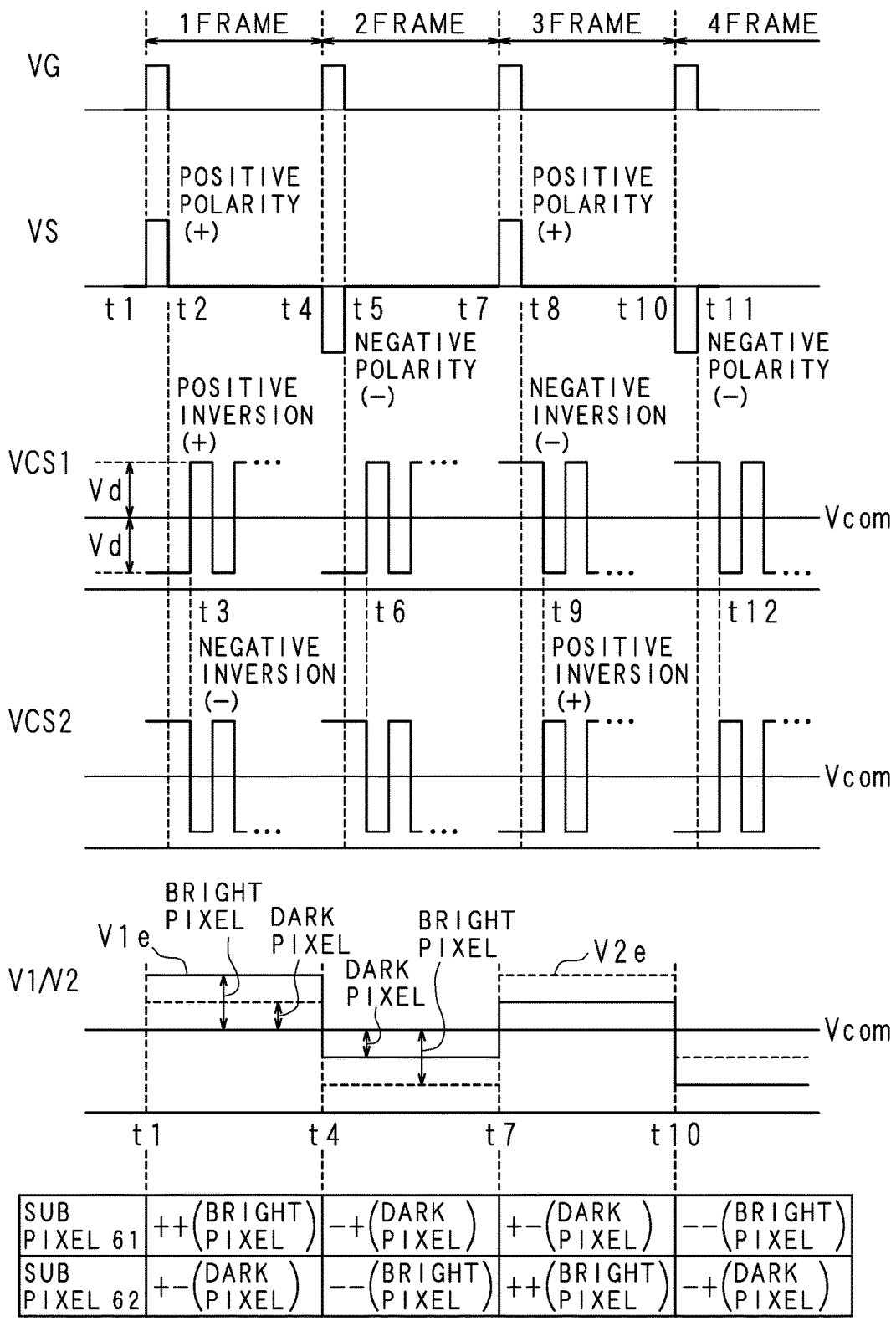
FIG. 10 is a time chart illustrating one example of timing of voltages of each part when attention is paid to any pixel within the liquid crystal panel by the display apparatus according to the first embodiment.

FIG. 10 is a time chart illustrating one example of timing of voltages of each part when attention is paid to any pixel within the liquid crystal panel 30 by the display apparatus 100 according to the first embodiment. FIG. 10 is a time chart when corresponding to between the first frame and the fourth frame exemplified in FIG. 9.

Further, voltage waveforms of each part illustrated in FIG. 10 are schematically represented, and the voltage waveforms are often different from the actual voltage waveform. In FIG. 10, the gate voltage VG, the source voltage VS, the first CS voltage VCS1, the second CS voltage VCS2, an effective value V1E (solid line) of the one electrode voltage V1 of the subpixel 61, and an effective value V2E of the one electrode voltage V2 of the subpixel 62 are illustrated from the top.

When attention is paid to one pixel (subpixels 61 and 62), the gate signal is repeatedly supplied to the gate bus line 71 at a prescribed frame period. FIG. 10 illustrates the first frame to the fourth frame. In the first frame, the gate voltage VG becomes from low to high at time t1, and the gate voltage VG becomes from high to low at time t2. Similarly, in the second frame, the gate voltage VG becomes from low to high at time t4, and the gate voltage VG becomes from high to low at time t5. Further, in the third frame, the gate voltage VG becomes from low to high at time t7, and the gate voltage VG becomes from high to low at time t8. Further, in the fourth frame, the gate voltage VG becomes from low to high at time t10, and the gate voltage VG becomes from high to low at time t11.

In a period (for example, a period from time t1 to time t2 in the first frame) when the gate voltage VG is high, the FET 91 and the FET 92 are turned on, and the source signal (source voltage VS) is applied to the one electrodes of the subpixels 61 and 62, respectively. FIG. 10 illustrates only a timing when the source voltage VG is applied. Further, the source voltage is the positive polarity in the first frame, is the negative polarity inverted with respect to the positive polarity in the second frame, the positive polarity inverted with respect to the negative polarity in the third frame, and the negative polarity inverted with respect to the positive polarity in the fourth frame. That is, the polarities of the source signals supplied to the subpixel 61 and the subpixel 62 are inverted at a prescribed frame period in synchronization with the gate signal.

The first CS signal and the second CS signal have different polarities from each other, and are signals of which the amplitude is changed by ±VD with the reference voltage VCOM interposed therebetween. In addition, at time t3 after time t2 in the first frame, the first CS voltage VCS1 is increased by (2×VD) from VCOM−VD to VCOM+VD (positive inversion). Further, at time t3, the second CS voltage VCS2 is decreased by (2×VD) from VCOM+VD to VCOM−VD (negative inversion).

In the second frame, similar to the case of the first frame, the first CS voltage VCS1 is positively inverted at time t6, and the second CS voltage VCS2 is negatively inverted at time t6.

In the third frame, the first CS voltage VCS1 is negatively inverted at time t9, and the second CS voltage VCS2 is positively inverted at time t9. Further, in the fourth frame, similar to the case of the third frame, the first CS voltage VCS1 is negatively inverted at time t12, and the second CS voltage VCS2 is positively inverted at time t12.

That is, the liquid crystal controller 20 inverts the respective polarities of the first CS signal and the second CS signal, by setting 2N times (N is an integer) of the frame period to be a prescribed period.

In the first frame, at time t2, the voltage V1 of the one electrode of the subpixel 61 is equal to the source voltage VS. As described above, since the first CS voltage VCS1 is increased by (2×VD) at time t3, the voltage V1 of the one electrode of the subpixel 61 is increased by ΔV from the voltage VS by the thrust-up action of the first CS voltage, and thus V1=VS+ΔV. Herein, ΔV may be represented by ΔV=K×2×VD. However, K becomes K=CB/(CA+CB). Next, the first CS voltage VCS1 is repeatedly increased and decreased by 2×VD. Therefore, as also described in FIG. 4, the effective value V1E of the voltage V1 of the one electrode of the subpixel 61 becomes VS+ΔV/2.

Further, in the first frame, at time t2, the voltage V2 of the one electrode of the subpixel 62 is equal to the source voltage VS. As described above, since the second CS voltage VCS2 is decreased by (2×VD) at time t3, the voltage V2 of the one electrode of the subpixel 62 is decreased by ΔV from the voltage VS by the thrust-down action of the second CS voltage, and thus V2=VS−ΔV. Next, the second CS voltage VCS2 is repeatedly increased and decreased by 2×VD. Therefore, as also described in FIG. 4, the effective value V2E of the voltage V2 of the one electrode of the subpixel 62 becomes VS−ΔV/2. That is, V1E>V2E.

In the first frame, a voltage as much as (V1E−VCOM) is applied between the electrodes of the subpixel 61, thus to become the bright pixel. Further, in the first frame, a voltage as much as (V2E−VCOM) is applied between the electrodes of the subpixel 62, thus to become the dark pixel.

Next, in the second frame, at time t5, the voltage V1 of the one electrode of the subpixel 61 is equal to the source voltage (−VS). As described above, since the first CS voltage VCS1 is increased by (2×VD) at time t6, the voltage V1 of the one electrode of the subpixel 61 is increased by ΔV from the voltage −VS by the thrust-up action of the first CS voltage, and thus V1=−VS+ΔV. Next, the first CS voltage VCS1 is repeatedly increased and decreased by 2×VD, and therefore the effective value V1E of the voltage V1 of the one electrode of the subpixel 61 becomes −VS+ΔV/2.

Further, in the second frame, at time t5, the voltage V2 of the one electrode of the subpixel 62 is equal to the source voltage (−VS). As described above, since the second CS voltage VCS2 is decreased by (2×VD) at time t6, the voltage V2 of the one electrode of the subpixel 62 is decreased by ΔV from the voltage VS by the thrust-down action of the second CS voltage, and thus V2=−VS−ΔV. Next, the second CS voltage VCS2 is repeatedly increased and decreased by 2×VD, and therefore the effective value V2E of the voltage V2 of the one electrode of the subpixel 62 becomes −VS−ΔV/2. That is, V1E>V2E.

In the second frame, a voltage as much as (VCOM−V1E) is applied between the electrodes of the subpixel 61, thus to become the dark pixel. Further, in the second frame, a voltage as much as (VCOM−V2E) is applied between the electrodes of the subpixel 62, thus to become the bright pixel.

Next, in the third frame, at time t8, the voltage V1 of the one electrode of the subpixel 61 is equal to the source voltage VS. As described above, since the first CS voltage VCS1 is decreased by (2×VD) at time t9, the voltage V1 of the one electrode of the subpixel 61 is decreased by ΔV from the voltage VS by the thrust-down action of the first CS voltage, and thus V1=VS−ΔV. Next, the first CS voltage VCS1 is repeatedly increased and decreased by 2×VD, and therefore the effective value V1E of the voltage V1 of the one electrode of the subpixel 61 becomes VS−ΔV/2.

Further, in the third frame, at time t8, the voltage V2 of the one electrode of the subpixel 62 is equal to the source voltage VS. As described above, since the second CS voltage VCS2 is increased by (2×VD) at time t9, the voltage V2 of the one electrode of the subpixel 62 is increased by ΔV from the voltage VS by the thrust-up action of the second CS voltage, and thus V2=VS+ΔV. Next, the second CS voltage VCS2 is repeatedly increased and decreased by 2×VD, and therefore the effective value V2E of the voltage V2 of the one electrode of the subpixel 62 becomes VS+ΔV/2. That is, V2E>V1E.

In the third frame, a voltage as much as (V1E−VCOM) is applied between the electrodes of the subpixel 61, thus to become the dark pixel. Further, in the third frame, a voltage as much as (V2E−VCOM) is applied between the electrodes of the subpixel 62, thus to become the bright pixel.

Next, in the fourth frame, at time t11, the voltage V1 of the one electrode of the subpixel 61 is equal to the source voltage −VS. As described above, since the first CS voltage VCS1 is decreased by (2×VD) at time t12, the voltage V1 of the one electrode of the subpixel 61 is decreased by ΔV from the voltage −VS by the thrust-down action of the first CS voltage, and thus V1=−VS−ΔV. Next, the first CS voltage VCS1 is repeatedly increased and decreased by 2×VD, and therefore the effective value V1E of the voltage V1 of the one electrode of the subpixel 61 becomes −VS−ΔV/2.

Further, in the fourth frame, at time t11, the voltage V2 of the one electrode of the subpixel 62 is equal to the source voltage (−VS). As described above, since the second CS voltage VCS2 is increased by (2×VD) at time t12, the voltage V2 of the one electrode of the subpixel 62 is increased by ΔV from the voltage −VS by the thrust-up action of the second CS voltage, and thus V2=−VS+ΔV. Next, the second CS voltage VCS2 is repeatedly increased and decreased by 2×VD, and therefore the effective value V2E of the voltage V2 of the one electrode of the subpixel 62 becomes −VS+ΔV/2. That is, V2E>V1E.

In the fourth frame, a voltage as much as (VCOM−V1E) is applied between the electrodes of the subpixel 61, thus to become the bright pixel. Further, in the fourth frame, a voltage as much as (VCOM−V2E) is applied between the electrodes of the subpixel 62, thus to become the dark pixel.

As described above, the positive source signal is supplied at the first frame of the frame period, the negative source signal is supplied at the second frame, the positive source signal is supplied at the third frame, and the negative source signal is supplied at the fourth frame. In this case, the first CS signal is positively inverted and the second CS signal is negatively inverted, at the first frame and the second frame, and the polarities of each of the first CS signal and the second CS signal are inverted, thus the first CS signal is negatively inverted, and the second CS signal is positively inverted, at the third frame and the fourth frame. Thereby, one subpixel is switched to the bright pixel and the dark pixel for each two frame, and the other subpixel may be switched to the dark pixel and the bright pixel for each two frame, such that the subpixels are viewed as the average brightness of the bright pixel and the dark pixel to human eyes. Accordingly, since the bright pixel and the dark pixel are viewed without distinction, it is possible to prevent a deterioration in display quality due to an arrangement of the zigzag pattern or the checkered pattern in the low gradation area. Further, since if the frame period (driving frequency) is small, the flicker is viewed, it is preferable to be used in a high-speed driving mode such as, for example, 120 Hz or more.

(Second Embodiment)

Figure 11:
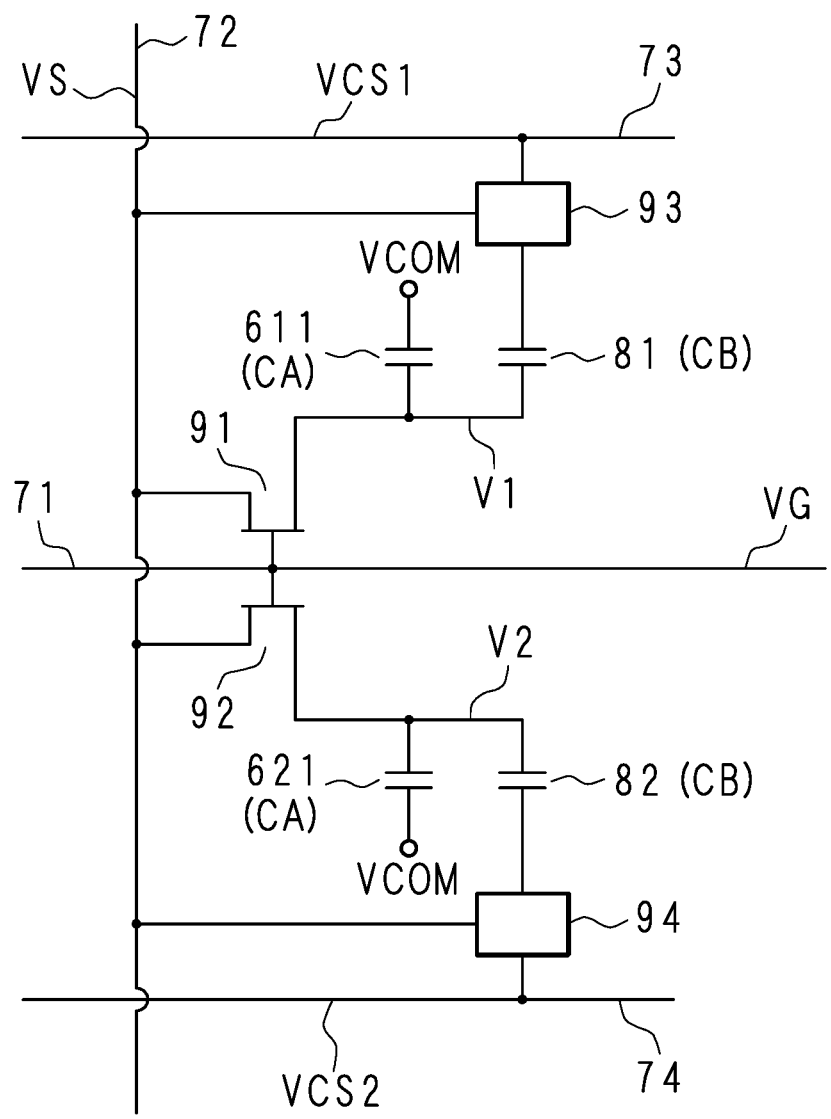
FIG. 11 is a schematic view illustrating one example of a configuration of a pixel of a display apparatus according to a second embodiment.
Figure 12:
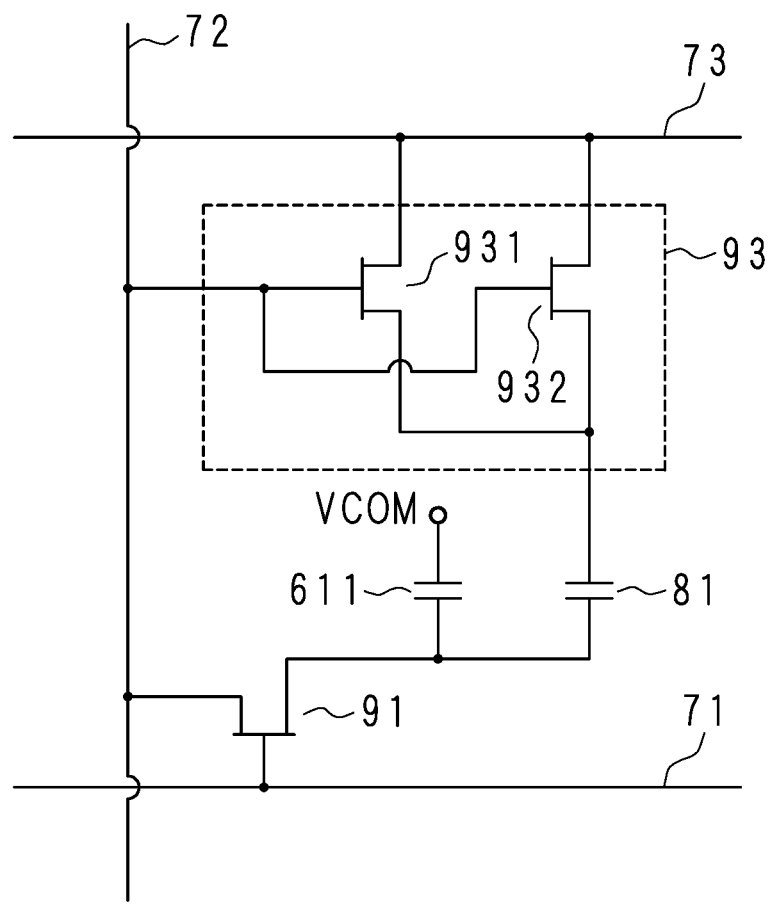
FIG. 12 is a schematic view illustrating a detail of the configuration illustrated in FIG. 11.

FIG. 11 is a schematic view illustrating one example of a configuration of a pixel of a display apparatus 100 according to a second embodiment, and FIG. 12 is a schematic view illustrating details of the configuration illustrated in FIG. 11. In FIG. 11, source voltage detection and CS voltage application switching units 93 and 94 as an auxiliary switching element are illustrated.

The details of the configuration of the source voltage detection and CS voltage application switching unit 93 are illustrated in FIG. 12. Further, the configurations of the source voltage detection and CS voltage application switching units 93 and 94 are the same as each other, therefore FIG. 12 illustrates only the source voltage detection and CS voltage application switching unit 93. Further, the second embodiment has the same configuration as that exemplified in FIG. 1.

As illustrated in FIG. 12, the source voltage detection and CS voltage application switching unit 93 includes FETs 931 and 932 as the auxiliary switching element. Gates of the FETs 931 and 932 are connected to the source bus line 72, and sources of the FET 931 and 932 are connected to the first CS bus line 73. Drains of the FETs 931 and 932 are connected to the other terminal of the auxiliary capacitor 81. The FETs 931 and 932 are turned on or off depending on a source voltage.

In the second embodiment, when the gradation value of any one pixel of the plurality of pixels is lower than the prescribed value, the liquid crystal controller 20 controls so that the brightness values of the subpixel 61 and the subpixel 62 of the any pixel are equal to each other. The case in which brightness value is lower than the prescribed value means that the pixel is present in the low gradation area. Further, the prescribed value may be determined based on whether the dark pixel which is displayed completely black appears as the zigzag pattern or the checkered pattern.

Thereby, when any pixel is present in the low gradation area, since the brightness values of the subpixel 61 and the subpixel 62 of the pixel are equal to each other, in particular, since the FETs 931 and 932 are turned off, the multi-pixel driving is turned off, such that it is possible to reliably prevent the zigzag pattern or the checkered pattern from appearing in the dark pixel which is displayed completely black.

Figure 13:
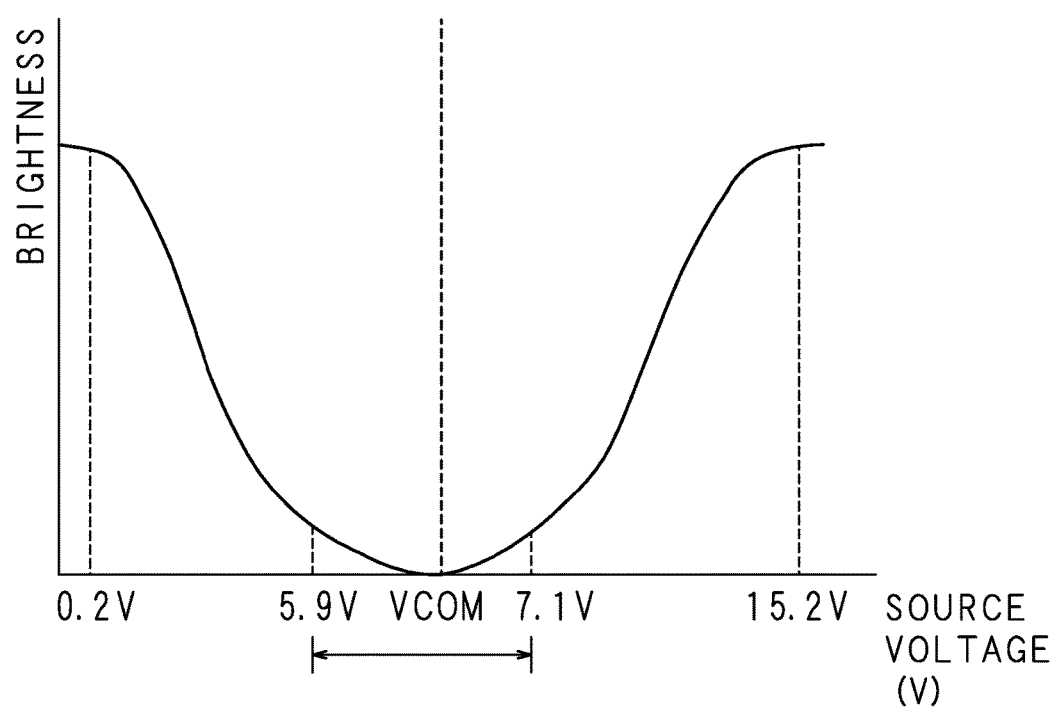
FIG. 13 is an explanatory view illustrating one example of an on and/or off control of FET according to the second embodiment.

FIG. 13 is an explanatory view illustrating one example of an on and/or off control of the FETs 931 and 932 according to the second embodiment. When a gate threshold voltage of the FET 931 (p type) is set to be, for example, 5.9 V, and a source voltage applied to the gate is set to be 5.9 V or less, the FET 931 is turned on. Further, when the gate threshold voltage of the FET 932 (n type) is set to be, for example, 7.1 V, and the source voltage applied to the gate is set to be 7.1 V or more, the FET 932 is turned on. The threshold voltages 5.9 V and 7.1 V may be set with the reference voltage VCOM interposed therebetween, and within a range from 5.9 V to 7.1 V of the source voltage, becomes the low gradation area having a relatively small brightness value.

As described above, the display apparatus includes the source voltage detection and CS voltage application switching units 93 and 94 connected to each of the auxiliary capacitors 81 and 82 in series. When the voltages of the source signals are in the prescribed range with the reference voltage VCOM interposed therebetween, each of the source voltage detection and CS voltage application switching units 93 and 94 is turned off. Since the voltage applied between the electrodes of the subpixel 61 and the subpixel 62 is in proportion to a voltage difference between the source voltage and the reference voltage VCOM, the case in which the voltages of the source signals are within the prescribed range with the reference voltage interposed therebetween refers to a case that the voltage applied between the electrodes of the subpixel 61 and the subpixel 62 is small, and means that the pixel is present in the low gradation area. That is, when the pixel is in the low gradation area, since the source voltage detection and CS voltage application switching units 93 and 94 are turned off, thereby the first CS signal and the second CS signals are not supplied. As a result, a so-called multi-pixel driving is turned off, such that the brightness values of the subpixel 61 and the subpixel 62 are equal to each other. Thereby, in the low gradation area, it is possible to reliably prevent the zigzag pattern or the checkered pattern from appearing in the dark pixel which is displayed completely black.

Further, only the first embodiment may be applied, only the second embodiment may be applied, or both of the first and second embodiments may be simultaneously applied.

(Third Embodiment)

FIG. 14 is a schematic view illustrating one example of the multi-pixel driving by a display apparatus 100 according to the third embodiment. The multi-pixel driving of the third embodiment operates in connection with flickering of the backlight 50, in addition to the multi-pixel driving according to the first embodiment exemplified in FIG. 9. That is, the backlight control unit 40 controls so as to flicker the backlight 50 in synchronization with the frame period. In the example of FIG. 14, the backlight 50 is turned off in the first frame, the backlight 50 is turned on in the second frame, the backlight 50 is turned off in the third frame, and the backlight 50 is turned on in the fourth frame.

For example, when the subpixel 61 is switched to the bright pixel and the dark pixel for each two frame, and the subpixel 62 is switched to the dark pixel and the bright pixel for each two frame, the backlight 50 flickers for each one frame, thereby equivalently (in appearance), the subpixel 61 may be switched to the bright pixel and the dark pixel for each one frame, and the subpixel 62 may be switched to the dark pixel and the bright pixel for each one frame, such that the subpixels are viewed as the average brightness of the bright pixel and the dark pixel to the human eyes. Accordingly, since the bright pixel and the dark pixel are viewed without distinction, it is possible to prevent a deterioration in display quality due to an arrangement of the zigzag pattern or the checkered pattern in the low gradation area.

Further, according to the third embodiment, when the backlight 50 flickers for each one frame by using the liquid crystal panel 30 in which the frame period (driving frequency) is set to be 240 Hz, the contrast of the multi-pixel is repeated at 120 Hz, and thus it is possible to prevent an occurrence of the flicker.

As this description may be embodied in several forms without departing from the spirit of essential characteristics thereof, the above-described embodiments are therefore illustrative and not restrictive. Since the scope is defined by the appended claims rather than by the description preceding them, and all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus including a liquid crystal panel having a plurality pixels arranged in a matrix shape, in which the plurality of pixels each has a first subpixel and a second subpixel that are divided from each other, the display apparatus comprising:
   a controller configured to control a level of brightness values of the first subpixel and the second subpixel of any one pixel of the plurality of pixels so as to be switched at a prescribed period, wherein, when a gradation value of any one pixel of the plurality of pixels is lower than a prescribed value, the controller controls so that the brightness values of the first subpixel and the second subpixel of the pixel are equal to each other.

2. A display apparatus including a liquid crystal panel having a plurality pixels arranged in a matrix shape, in which the plurality of pixels each has a first subpixel and a second subpixel that are divided from each other, the display apparatus comprising:
   a controller configured to control a level of brightness values of the first subpixel and the second subpixel of any one pixel of the plurality of pixels so as to be switched at a prescribed period;
   a gate bus line to which a gate signal is supplied;
   a source bus line to which a source signal is supplied;
   a first auxiliary bus line and a second auxiliary bus line to which a first auxiliary signal and a second auxiliary signal having different polarities from each other are supplied, respectively;
   a first FET and a second FET which are connected to the gate bus line and the source bus line, respectively; and
   a first auxiliary capacitor and a second auxiliary capacitor which are connected to the first auxiliary bus line and the second auxiliary bus line, respectively,
   wherein one electrode of the first subpixel is connected to the first FET and the first auxiliary capacitor,
   one electrode of the second subpixel is connected to the second FET and the second auxiliary capacitor,
   the other electrodes of the first subpixel and the second subpixel are respectively connected to a voltage source which supplies a reference voltage,
   polarities of the source signals supplied to the first subpixel and the second subpixel are configured to be inverted at a prescribed frame period in synchronization with the gate signal, and
   the controller is configured to invert the respective polarities of the first auxiliary signal and the second auxiliary signal, by setting 2N times (N is an integer) of the frame period to be the prescribed period,
   further comprising:
   a first auxiliary FET and a second auxiliary FET which are respectively connected to the first auxiliary capacitor and the second auxiliary capacitor in series,
   wherein each of the first auxiliary FET and the second auxiliary FET is turned off when voltages of the source signals are within a prescribed range with a reference voltage interposed therebetween.

3. The display apparatus of claim 1, comprising:
   a gate bus line to which a gate signal is supplied;
   a source bus line to which a source signal is supplied;
   a first auxiliary bus line and a second auxiliary bus line to which a first auxiliary signal and a second auxiliary signal having different polarities from each other are supplied, respectively;
   a first FET and a second FET which are connected to the gate bus line and the source bus line, respectively; and
   a first auxiliary capacitor and a second auxiliary capacitor which are connected to the first auxiliary bus line and the second auxiliary bus line, respectively,
   wherein one electrode of the first subpixel is connected to the first FET and the first auxiliary capacitor,
   one electrode of the second subpixel is connected to the second FET and the second auxiliary capacitor,
   the other electrodes of the first subpixel and the second subpixel are respectively connected to a voltage source which supplies a reference voltage,
   polarities of the source signals supplied to the first subpixel and the second subpixel are configured to be inverted at a prescribed frame period in synchronization with the gate signal, and
   the control unit is configured to invert the respective polarities of the first auxiliary signal and the second auxiliary signal, by setting 2N times (N is an integer) of the frame period to be the prescribed period.

4. The display apparatus of claim 2, wherein, when a gradation value of any one pixel of the plurality of pixels is lower than a prescribed value, the controller controls so that the brightness values of the first subpixel and the second subpixel of the pixel are equal to each other.

5. The display apparatus of claim 2, comprising:
   a backlight for the liquid crystal panel; and
   a backlight controller configured to control so as to flicker the backlight in synchronization with the frame period.

6. The display apparatus of claim 3, comprising:
   a backlight for the liquid crystal panel; and
   a backlight controller configured to control so as to flicker the backlight in synchronization with the frame period.

* * * * *